Patented Apr. 21, 1931

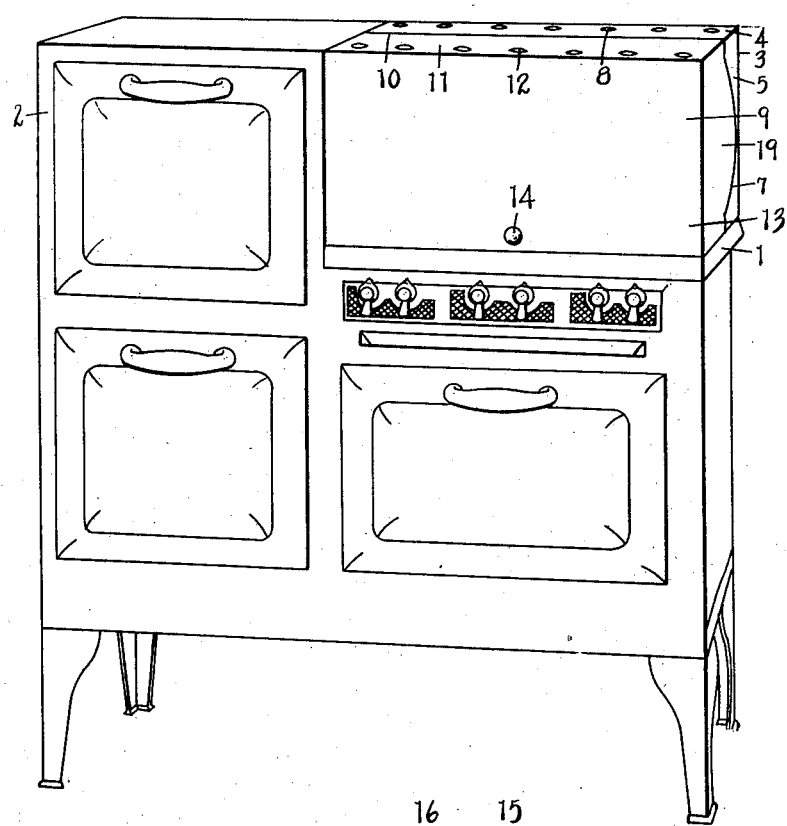
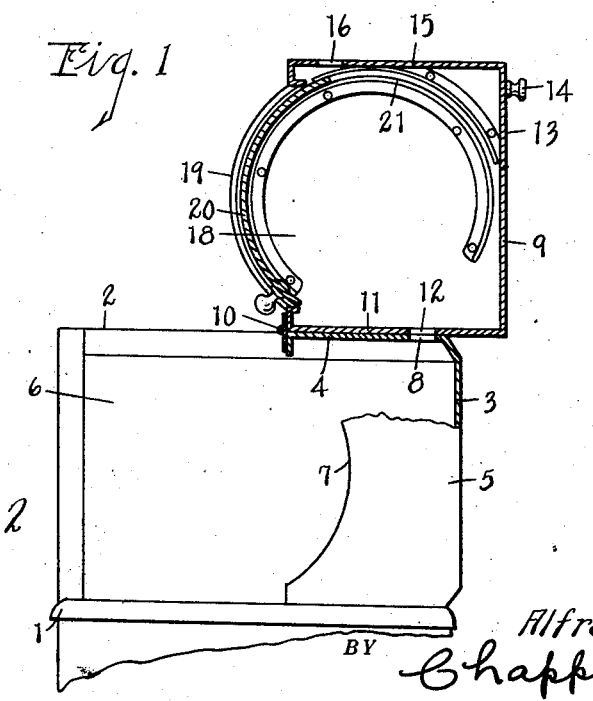

1,801,641

UNITED STATES PATENT OFFICE

ALFRED J. REEDY, OF BATTLE CREEK, MICHIGAN, ASSIGNOR TO A-B STOVE COMPANY, OF BATTLE CREEK, MICHIGAN

COOKING STOVE OR RANGE

Application filed October 5, 1929. Serial No. 397,464.

The main objects of this invention are:

First, to provide in a cooking stove or range having an open top cooking unit a combined cover and warming oven.

Second, to provide in a cooking stove or range having an open top cooking unit a combined cover and warming oven structure which is attractive in appearance when adjusted for either purpose and is easily adjusted.

Objects relating to details and economies of my invention will appear from the description to follow. The invention is defined and pointed out in the claims.

A structure which is a preferred embodiment of my invention is illustrated in the accompanying drawing, in which:

Fig. 1 is a front perspective view of a gas stove or range embodying my invention with the cover for the open top cooking unit in closed position.

Fig. 2 is a fragmentary vertical section from front to rear with the open cooking top cover unit adjusted to a position to serve as a cooking oven.

The structure illustrated in the accompanying drawing comprises an open top cooking unit designated generally by the numeral 1 and a closed or oven cooking unit designated generally by the numeral 2. These units are disposed side by side with the oven or closed unit 2 extending above the open top unit 1.

The open top unit is provided with a fixed cover or hood unit comprising a rear wall 3, a top 4 and an outer end wall 5, this outer end wall being disposed in opposed relation to the side 6 of the closed unit 2. The end wall 5 has a curved recess 7 at its forward edge. The top 4 is provided with openings 8 for the passage of heated air and gases from the cooking top 1.

The combined cover and warming oven unit 9 is hinged at 10 to the front edge of the top 4 so that it may be swung rearwardly thereon, as shown in Fig. 1, in which position it constitutes a warming oven, and may be swung to top cover position, shown in Fig. 1.

The wall 11 of the warming oven which constitutes the top wall of the cover is provided with openings 12 which register with the openings 8 when the unit 9 is adjusted as a cover.

The wall 13 of the unit 9 constitutes the front wall of the cover and is provided with a knob 14 for convenience in manipulation.

The wall 15 of the unit 9 constitutes the top of the warming oven and is provided with a vent opening 16.

The outer end wall 18 of the warming oven unit is provided with a curved extension 19 fitting into the recess 7 of the outer end wall 5 of the fixed cover unit when the unit 9 is adjusted to a position to constitute a cover.

The warming oven unit is provided with a curved sliding door 20 slidably supported in a track or way 21 on the ends of the warming oven unit.

With the parts thus arranged, when the cover is open, an effective warming oven is provided and when closed, an effective cover for the open top cooking unit is provided.

I have illustrated and described my improvements in an embodiment which I consider very practical. I have not attempted to illustrate or describe other embodiments and adaptations as it is believed that this disclosure will enable those skilled in the art to embody or adapt the same as may be desired.

Having thus described my invention, what I claim as new and desire to secure by Letters Patent, is:

1. The combination in a cooking stove comprising a closed cooking unit and an open top cooking unit disposed side by side with the closed unit projecting above the open unit, a fixed cover unit for the open unit comprising a rear wall, a top and an outer end wall, the top being disposed in the plane of the top of the closed unit and having openings therein, the end wall being disposed in opposed relation to the side of the closed unit and having a curved recess in its forward edge, and a combined warming oven and cover unit hinged to the front edge of the top of the fixed cover unit to swing rearwardly thereon when adjusted as a warming oven or to swing forwardly over the open unit, said combined unit having an end wall provided with a curved extension complementing the curved recess in the fixed unit end wall, said combined unit having openings in one of its walls registering with the openings in said fixed unit top wall when adjusted as a warming oven, and a curved sliding door for said combined unit.

2. The combination in a cooking stove comprising a closed cooking unit and an open top cooking unit disposed side by side with the closed unit projecting above the open unit, a fixed cover unit for the open unit comprising a rear wall, a top and an outer end wall, the top being disposed in the plane of the top of the closed unit and having openings therein, and a combined warming oven and cover unit hinged to the front edge of the top of the fixed cover unit to swing rearwardly thereon when adjusted as a warming oven or to swing forwardly over the open unit, said combined unit having openings in one of its walls registering with the openings in said fixed unit top wall when adjusted as a warming oven, and a door for said combined unit.

3. The combination in a cooking stove comprising a closed cooking unit and an open top cooking unit disposed side by side with the closed unit projecting above the open unit, a fixed cover unit for the open unit comprising a rear wall, a top and an outer end wall, the end wall being disposed in opposed relation to the side of the closed unit and having a curved recess in its forward edge, and a combined warming oven and cover unit hinged to the front edge of the top of the fixed cover unit to swing rearwardly thereon when adjusted as a warming oven or to swing forwardly over the open unit, said combined unit having an end wall provided with a curved extension complementing the curved recess in the fixed unit end wall, and a curved sliding door for said combined unit.

4. The combination in a cooking stove comprising a closed cooking unit and an open top cooking unit disposed side by side with the closed unit projecting above the open unit, a fixed cover unit for the open unit comprising a rear wall, a top and an outer end wall, and a combined warming oven and cover unit hinged to the front edge of the top of the fixed cover unit to swing rearwardly thereon when adjusted as a warming oven or to swing forwardly over the open unit, and a door for said combined unit collapsible therein to permit the swinging of the combined unit over articles on the cooking top.

5. The combination in a cooking stove having an open top cooking unit, of a fixed cover unit disposed at the rear of said open top cooking unit and provided with a top having openings therein, and a combined warming oven and cover unit mounted on said fixed cover unit to swing rearwardly thereon when adjusted as a warming oven or to swing forwardly over the open cooking top when adjusted as a cover, said combined unit having openings in one of its walls registering with the openings in said fixed unit top when the combined unit is swung to open position.

6. The combination in a cooking stove having an open top cooking unit, of a fixed cover unit disposed at the rear of said open top cooking unit, and a combined warming oven and cover unit mounted on said fixed cover unit to swing rearwardly thereon when adjusted as a warming oven or to swing forwardly over the open cooking top when adjusted as a cover, said combined unit being provided with a door positioned at the front thereof when adjusted as a warming oven.

7. The combination in a cooking stove comprising an open cooking unit, a fixed cover unit for said cooking top comprising rear and end walls, the top having an opening therein, and a combined cooking oven and cover unit hinged to the front edge of the top of the fixed cover unit to swing rearwardly thereon when adjusted as a warming oven or to swing forwardly over the cooking top, said combined unit having an opening in one of its walls registering with the opening in said fixed unit top wall when adjusted as a warming oven, and a door for said combined unit.

8. The combination in a cooking stove comprising an open cooking unit, a fixed cover unit for said cooking top comprising rear and end walls, and a combined cooking oven and cover unit hinged to the front edge of the top of the fixed cover unit to swing rearwardly thereon when adjusted as a warming oven or to swing forwardly over the cooking top, and a door for said combined unit.

9. The combination in a cooking stove comprising an open cooking unit, a fixed cover unit for said cooking top comprising rear and end walls and a combined cooking oven and cover unit hinged to the front edge of the top of the fixed cover unit to swing rearwardly thereon when adjusted as a warming oven or to swing forwardly over the cooking top, and a door for said combined unit collapsing therein when opened.

In witness whereof I have hereunto set my hand.

ALFRED J. REEDY.